(12) United States Patent  
Demeyere et al.

(10) Patent No.: US 9,177,402 B2  
(45) Date of Patent: Nov. 3, 2015

(54) DISPLAY WALL LAYOUT OPTIMIZATION

(71) Applicant: Barco N.V., Kortrijk (BE)

(72) Inventors: Kristof R. Demeyere, Roeselare (BE); Pieter F. R. Demuytere, Zulte (BE)

(73) Assignee: Barco N.V., Kortrijk (BE)

( * ) Notice: Subject to any disclaimer, the term of this patent is extended or adjusted under 35 U.S.C. 154(b) by 393 days.

(21) Appl. No.: 13/720,213

(22) Filed: Dec. 19, 2012

(65) Prior Publication Data

US 2014/0173507 A1    Jun. 19, 2014

(51) Int. Cl.
*G06F 3/048* (2013.01)
*G06T 11/60* (2006.01)
*G06F 3/00* (2006.01)

(52) U.S. Cl.
CPC . *G06T 11/60* (2013.01); *G06F 3/00* (2013.01); *G06F 3/048* (2013.01)

(58) Field of Classification Search
CPC .................................. G06F 3/048; G06F 3/00
USPC .................. 715/789, 780, 764, 763
See application file for complete search history.

(56) References Cited

U.S. PATENT DOCUMENTS

| 5,299,284 | A | 3/1994 | Roy |
| 7,278,142 | B2 * | 10/2007 | Bandhole et al. ............. 718/104 |
| 8,082,549 | B2 | 12/2011 | Corley, Jr. et al. |
| 8,195,784 | B2 | 6/2012 | Smith et al. |
| 8,336,055 | B2 * | 12/2012 | Hack et al. ............. 718/104 |
| 8,589,140 | B1 * | 11/2013 | Poulin ............. 703/22 |
| 8,892,693 | B2 * | 11/2014 | Quan et al. ............. 709/219 |
| 8,954,611 | B2 * | 2/2015 | Chan et al. ............. 709/248 |
| 2007/0028151 | A1 * | 2/2007 | Miller et al. ............. 714/49 |
| 2008/0062304 | A1 | 3/2008 | Villeneuve et al. |
| 2008/0313282 | A1 * | 12/2008 | Warila et al. ............. 709/206 |

OTHER PUBLICATIONS

Yau et al.; "Adaptive Resource Allocation for Service-Based Systems"; *International Journal of Software and Informatics*; Dec. 2009; pp. 483-499; vol. 3, No. 4.

* cited by examiner

*Primary Examiner* — David Phantana Angkool
(74) *Attorney, Agent, or Firm* — Renner, Otto, Boisselle and Sklar, LLP

(57) ABSTRACT

The present invention provides a system, method, and apparatus for optimally determining, for a layout of windows on a display wall of a display system, the quality of display content to display in each window without exceeding system resources. The display system receives display content from at least one source, at least one of the at least one source providing display content at multiple qualities. Displaying display content uses system resources, and displaying high quality display content uses more system resources than displaying low quality display content. A received layout defines an arrangement of windows on the display wall, each window directed to displaying display content from one source. An objective function defines the quality of display content displayed in each window. The objective function is optimized to determine an optimized layout that does not exceed system resources.

38 Claims, 4 Drawing Sheets

DISPLAY WALL LAYOUT OPTIMIZATION

TECHNICAL FIELD

The present invention relates generally to display systems (e.g. display walls), and particularly to methods and systems for optimizing a layout of windows displayed on the display system.

BACKGROUND

Modern display systems often include display walls composed of sets of display renderers (e.g., monitors, televisions, and/or projectors). Display systems are often assigned a layout that fits a particular usage of the display wall. The layout describes an arrangement of windows with associated sources providing display content at different qualities. Each window defines an area on the display wall in which display content is visualized. Due to the limited system resources of the components of the display system, it is important to manage system resources by selecting the quality of display content in each window of the layout such that the display system is capable of displaying the display content as defined in the layout. For example, in display walls receiving display content streamed over a network from the sources, the display renderers are dependent on and limited by the network to receive the display content sources. In addition, each display renderer has limited capabilities and can only receive and compose a certain amount of display content. A display renderer may, due to its limited capabilities, need to use lower quality display content.

In display systems assigned a small layout including a small number of windows, it may be possible to manually determine the quality of display content to display in each window. However, as the number of windows in a layout increases, it becomes very time consuming and exceedingly difficult to manually determine the quality of display content to display in each window. There is also the possibility that a user may mistakenly exceed system resources (resulting in the display system being incapable of displaying the layout) or assign lower quality display content when the system has available resources to display higher quality display content.

SUMMARY

The present invention provides, for a layout of windows on a display wall, a system and method for optimally determining the quality of content to display in each window without exceeding system resources.

According to one aspect of the invention, a controller is provided for optimally determining, for a layout of windows on a display wall of a display system, the quality of display content to display in each window without exceeding system resources. The display system receives display content from at least one source, at least one of the at least one source providing display content at multiple qualities. Displaying display content uses system resources, and displaying high quality display content uses more system resources than displaying low quality display content. The controller is arranged to receive the layout. The layout defining an arrangement of windows on the display wall, where each window is directed to displaying display content from one source. The controller is also arranged to construct an objective function defining the quality of display content displayed in each window. The controller includes a processor. The processor is arranged to optimize the objective function to determine an optimized layout that does not exceed system resources. The controller outputs the optimized layout.

The objective function may be weighted to favor the selection of high quality display content for windows having larger areas.

In the objective function, the weight given to each window to favor the selection of high quality display content for windows having larger areas may be proportional to the area of the window.

Optimizing the objective function may include maximizing the objective function such that for the optimized layout a maximum of system resources are used without exceeding the system resources.

The objective function may be a linear objective function that is maximized using integer programming.

The objective function may be maximized using binary integer programming.

Constraints to the objective function may be constructed prior to optimizing the objective function and the objective function may be optimized within the constraints.

The display system may receive display content over a network and one constraint may be that a bandwidth required to receive all of the display content does not exceed a maximum allotted bandwidth of the network.

During optimization the objective function may not assign a quality level to the display content in a given window such that display content may not be displayed in the given window.

Constraints to the objective function may be constructed prior to optimizing the objective function, the objective function may be optimized within the constraints, and one constraint may be that each window is assigned a quality level that includes displaying display content in the window.

The multiple qualities may be low quality and high quality.

The multiple qualities may be differentiated by at least one of resolution, compression, color content, encryption, or further processing requirements.

The layout may define at least one of the number of windows, the position of each window, the shape of each window, and the area of each window.

The layout may be a user-defined layout.

Each source may be one of a camera or a computer.

The controller may comprise a processor arranged to execute instructions stored in a memory.

The display system may receive display content from more than one source.

The controller may calculate the window in the layout and the window area for each window in the layout.

The controller may be further arranged to receive a proposed layout and the processor may be further arranged to use the proposed layout as a seed point for optimizing the objective function.

The controller may be further arranged to provide instructions to the at least one source specifying the quality of display content to output.

According to another aspect of the invention, a display system is provided for optimally determining, for a layout of windows on a display wall of the display system, the quality of display content to display in each window without exceeding system resources. The display system includes a controller as above described, at least one display renderer, and display wall. Each display renderer is responsible for displaying display content on a particular region of the display wall. Each display renderer receives display content from at least one of the at least one source. The layout of windows is displayed on the display wall and display content is displayed in each window at the quality level specified in the optimized layout.

The at least one display renderer may receive display content over a network. The system resources may include at least one of a maximum network bandwidth, a maximum bandwidth of each display renderer to receive display content, a maximum decoding capacity of each display renderer to decode display content, and a maximum encoding capacity of each source to encode display content.

The objective function may be constrained such that for each display renderer, a bandwidth required to receive all of the display content received by each display renderer over the network does not exceed the maximum bandwidth of that display renderer.

The objective function may be constrained such that for each display renderer, a decoding capacity required to decode all of the display content received by that display renderer does not exceed the maximum decoding capacity available to that display renderer to decode display content.

The objective function may be constrained such that for each display renderer, an encoding capacity required to encode all of the display content received by that display renderer does not exceed the maximum encoding capacity available to each source to encode display content.

The system may include at least two display renderers.

The objective function may be constrained, for windows spanning multiple display renderers, to apply the same quality for each region of the window.

At least one window in the layout may include display content displayed by at least two display renderers.

The objective function may be constrained, for windows spanning multiple display renderers, to apply the same quality for each region of the window.

At least one window in the layout may include display content displayed by at least two display renderers.

At least two of the display renderers may have at least one of a different screen resolution, number of pixels, or pixel density.

The display system may receive display content from more than one source.

The objection function M may be defined as:

$$M = \sum_{i}^{N} \sum_{j}^{n_i} (w_x x_{ij} + w_y y_{ij}) a_{ij},$$

where N is the number of display renderers, $n_i$ is the number of windows in the layout that the $i^{th}$ display renderer has to show, $w_x$ is the weighting factor given to low quality display content, $w_y$ is the weighting factor given to high quality content, where $w_x < w_y$, $x_{ij}=1$ if the $i^{th}$ display renderer should use the low quality display content in window $w_{ij}$, $y_{ij}=1$ if the $i^{th}$ display renderer should use the high quality display content in window $w_{ij}$, and $a_{ij}$ is the area of the window $w_{ij}$.

The controller may calculate $w_{ij}$ and $a_{ij}$ for each window in the layout.

If adjacent windows $w_{ij}$ and $w_{kl}$ in the layout receive display content from the same source and window $w_{ij}$ is on the display renderer and $w_{kl}$ is on the $k^{th}$ display renderer, the objective function M may be constrained such that $x_{ij}=x_{kl}$ and $y_{ij}=y_{kl}$.

The objective function M may be constrained according to the following constraint:

$$b_x \sum_{j}^{n_i} x_{ij} + b_y \sum_{j}^{n_i} y_{ij} \le P, i = 1 \ldots N,$$

where $b_x$ is a bandwidth required to receive the low quality display content, $b_y$ is a bandwidth required to receive the high quality display content, and P is a maximum bandwidth that a display renderer has available to receive display content.

The objective function M may be constrained according to the following constraint:

$$b_x X + b_y Y \le B$$

where $b_x$ is a bandwidth required to receive the low quality display content, $b_y$ is a bandwidth required to receive the high quality display content, B is a maximum bandwidth of a network available to transfer display content to the display system. If the sources transfer the display content using unicast, then X and Y may be equal to:

$$X = \sum_{i}^{N} \sum_{j}^{n_i} x_{ij}$$

$$Y = \sum_{i}^{N} \sum_{j}^{n_i} y_{ij}$$

If the sources transfer the display content using multicast, then X and Y may be equal to:

$$X = \sum_{k}^{K} \left\{ 1 - \prod_{i}^{N} \prod_{j}^{n_i} (1 - x_{ij} s_{ijk}) \right\}$$

$$Y = \sum_{k}^{K} \left\{ 1 - \prod_{i}^{N} \prod_{j}^{n_i} (1 - y_{ij} s_{ijk}) \right\}$$

where K is the number of sources and $s_{ijk}=1$ if the window $w_{ij}$ is associated with the $k^{th}$ source and $s_{ijk}=0$ if the window $w_{ij}$ is not associated with the $k^{th}$ source.

The objective function M may be constrained according to the following constraint:

$$d_x \sum_{j}^{n_i} x_{ij} + d_y \sum_{j}^{n_i} y_{ij} \le D, i = 1 \ldots N,$$

where $d_x$ is a decoding capacity required to decode the low quality display content, $d_y$ is a decoding capacity required to decode the high quality display content, and D is a maximum decoding capacity that a display renderer has available to decode display content.

The display wall may be an IP display wall and the sources are streamed over a network to the display system.

Each display renderer may be one of a projector, a monitor, or a television.

A method may be provided for optimally determining, for a layout of windows on a display wall of a display system, the quality of display content to display in each window without exceeding system resources. The display system may receives display content from the at least one source, at least one of the at least one source providing display content at multiple qualities. Displaying display content may use system resources, and displaying high quality display content may use more system resources than displaying low quality display content. The method may include receiving the layout of the display wall. The layout may define an arrangement of windows on the display wall and each window may display content from one source. The method may also include constructing an objective function defining the quality of display content displayed in each window of the layout. The method may further include optimizing the objective function to determine an optimized layout that does not exceed system resources and outputting the optimized layout.

The objective function may be weighted to favor the selection of high quality display content for windows having larger areas.

The features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

DETAILED DESCRIPTION

The present invention provides, for a layout of windows on a display wall, a system and method for optimally determining the quality of content to display in each window without exceeding system resources. Optimally determining the quality of display content to display in each window without exceeding system resources involves constructing an objective function defining the quality of display content displayed in each window. The objective function is optimized to determine an optimized layout that does not exceed system resources. In this way, the quality of display content displayed in each window of the layout may be determined such that a maximum of system resources are used without exceeding system resources.

In smaller layouts having fewer windows, it may be possible to manually determine the quality of display content to display in each window. However, as the number of windows in a layout increases, it becomes very time consuming and exceedingly difficult to manually determine the quality of display content to display in each window. For example, when determining the quality of display content, a user needs to take into consideration, e.g., encoding and decoding capacity of each component in the display system, total network bandwidth, and bandwidth of the individual components in the system. While a user may seek to make optimal use of the system resources, the user may mistakenly exceed system resources or assign lower quality display content when the system has available resources to display higher quality display content.

Figure 1:
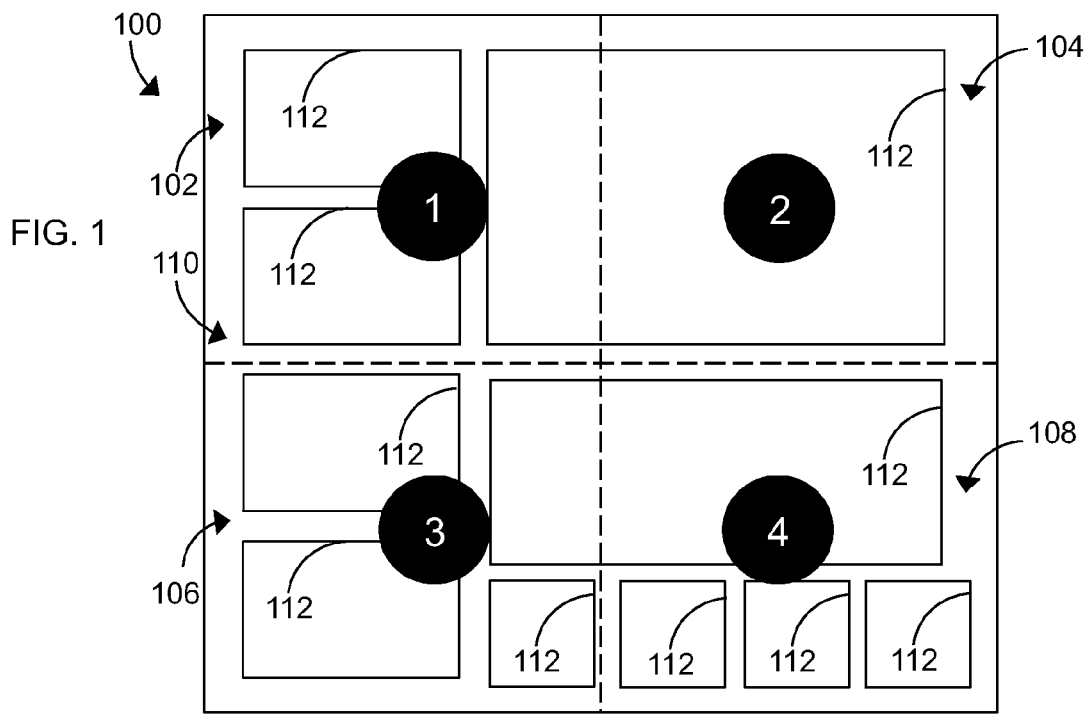
FIG. 1 is a representation of an exemplary layout displayed on a display system comprising a display wall.

Turning initially to FIG. 1, an exemplary display system comprising a display wall 100 is shown. A user-defined layout 110 including multiple windows 112 is displayed on the display wall 100. The display wall 100 allows visualization of a large number of windows 112 spread across the display renderers 102, 104, 106, 108. The display wall 100 includes four display renderers 102, 104, 106, 108 tiled together. The display renderers 102, 104, 106, 108 are each responsible for displaying content on a particular region of the display wall 100. The display wall 100 is divided into four regions separated by dashed lines and labeled 1-4, with the first display renderer 102 responsible for displaying content in region 1, the second display renderer 104 for displaying content in region 2, the third display renderer 106 for displaying content in region 3, and the fourth display renderer 108 for displaying content in region 4.

Figure 2A:
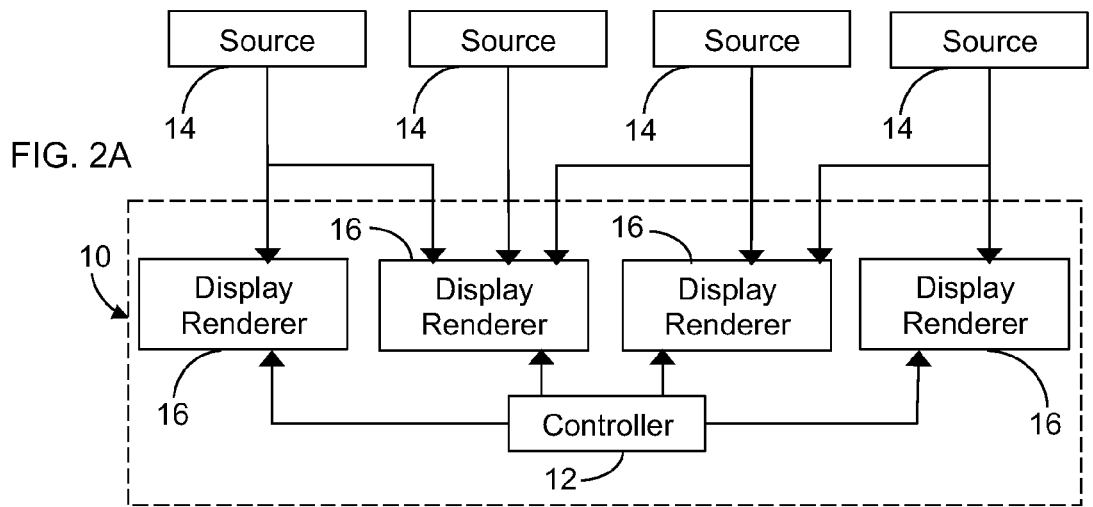
FIGS. 2A and 2B are block diagrams illustrating a display system.

An exemplary display system 10 in accordance with aspects of the present disclosure is illustrated in FIG. 2A. The display system 10 receives content from at least one source 14 and includes at least one display renderer 16 and a controller 12. The at least one display renderer 16 may receive display content from a single source 14 ("an associated source"). At least one of the at least one source 14 provides display content at multiple qualities. For example, a source 14 providing display content at multiple qualities may provide display content at a low quality and a high quality. "Sources", as used herein, are presumed to provide display content at multiple qualities. However, as will be understood by one of ordinary skill in the art, the display system may receive display content from sources that do not provide display content at multiple qualities. The multiple qualities may be differentiated by at least one of resolution, compression, color content, encryption, or further processing requirements. Displaying display content by the system uses system resources, with the display of high quality display content using more system resources than displaying low quality display content.

Figure 2B:
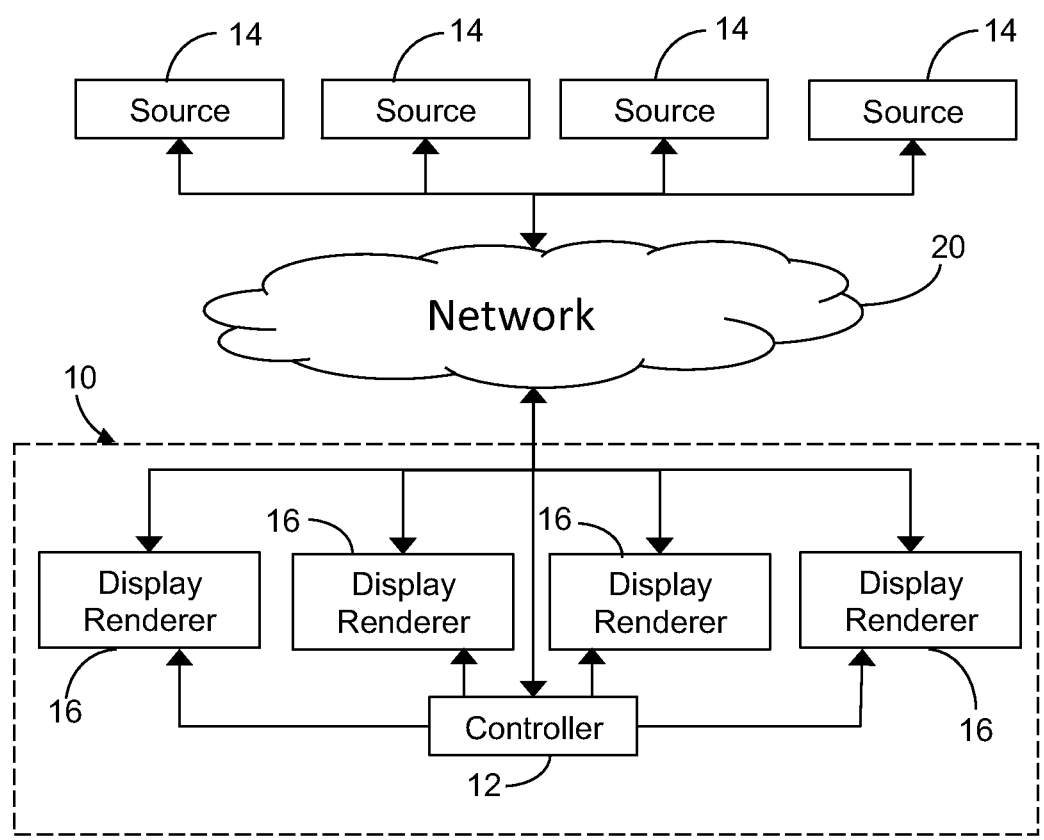

The at least one source 14 may be one of a web camera, video camera, security camera, networked camera, or computer. As will be understood by one of ordinary skill in the art, the at least one source 14 may include any source of video content. The display content provided by the at least one source 14 may be video content, still images, or any other form of content suitable for display on a display renderer 16. The at least one source 14 may provide display content to the display system 10 in any suitable manner. For example, in FIG. 2A each source 14 is directly connected to at least one display renderer 16. Alternatively, in FIG. 2B the display system 10 is an IP display system (e.g., an IP display wall) where the sources stream display content over a network 20 to the display system 10. The at least one source 14 may additionally be configured to receive instructions from the controller 12 regarding the quality of display content to provide to the at least one display renderer 16. For example, in FIG. 2B, the controller 12 is connected to the network 20, such that the controller 12 directs over the network 20 the quality of display content provided by the display renderers 16. As will be understood by one of ordinary skill in the art, the controller 12 may be connected to the sources 14 directly or in any suitable manner.

The display system 10 may receive display content from multiple sources 14. The display renderer 16 that is responsible for displaying the windows associated with the display content may receive the display content. A source may provide display content to one or more display renderers 16 and the display content may be displayed in more than one display window.

As will be understood by one of ordinary skill in the art, the at least one display renderer 16 may be a projector, television, monitor, or any other suitable display. For systems including multiple display renderers 16, two of the display renderers 16 may have at least one of a different screen resolution, number of pixels, aspect ratio, or pixel density.

The controller 12 optimally determines the quality of display content to display in each window of the layout without exceeding system resources. As will be understood by one of ordinary skill in the art, the controller 12 may have various implementations. For example, the controller 12 may include a processor or any other suitable device, such as a programmable circuit, integrated circuit, memory and I/O circuits, an application specific integrated circuit, microcontroller, complex programmable logic device, other programmable circuits, or the like. The controller 12 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor. The controller 12 may be a separate physical component or may be combined the at least one display renderer 16. For example, the controller 12 may be embodied in one of the at least one display renderer 16, as a combination of multiple display renderers 16, or in any other suitable manner.

The controller 12 may receive the layout defining the arrangement of windows on the display renderers 16. The layout may be user defined and may assign display content from one source to each window. The layout may define at least one of the number of windows, the position of each window, the shape of each window, and the area of each window in the layout. Alternatively, the controller may calculate the number of windows, the position of each window, the shape of each window, and the area of each window in the layout. For example, the layout may define the display renderer that each window is assigned to and the area of each window. Alternatively, the controller may determine the display renderer that each window is assigned and/or the area of each window. As an example, in FIG. 1, the only window ("the split window") in the second display renderer 104 is also included in the first display renderer 102. The window may be defined as two separate windows in the layout or the controller may determine that the window is contained in two display renderers and define the window as two separate windows. In FIG. 1, the split window is broken up into a first renderer component and a second renderer component. The first renderer component includes the portion of the split window that is displayed by the first renderer 102 and is assigned to the first display renderer 102. The second renderer component includes the portion of the split window that is displayed by the second renderer 104 and is assigned to the second display renderer 104.

The controller 12 constructs an objective function defining the quality of display content displayed in each window of the layout and optimizes the objective function to determine an optimized layout that does not exceed system resources. Windows in the optimized layout may be assigned a quality (e.g., low quality or high quality) or windows may not be assigned a quality of display content. For example, a window receiving display content from a source 14 that provides content at low quality or high quality may be assigned a low quality, a high quality, or no quality may be assigned to the window. For windows not assigned a quality, display content is not displayed in the window.

The objective function is optimized not to exceed the system resources. In this way the system resources act as a constraint on the objective function. The system resources may include a plurality of different constraints within which the objective function is optimized. For example, the system resources may include at least one of a maximum network bandwidth, a maximum bandwidth of each display renderer 16 to receive display content, a maximum decoding capacity of each display renderer 16 to decode display content, and a maximum encoding capacity of each source 14 to encode display content. The objective function may be constrained such that, for each display renderer 16, the bandwidth required to receive all of the display content received by the display renderer 16 over the network does not exceed the maximum bandwidth of the display renderer 16. Additionally, the objective function may be constrained such that, for each display renderer 16, a decoding capacity required to decode all of the display content received by the display renderer 16 does not exceed the maximum decoding capacity available to the display renderer 16 to decode display content. Similarly, another limitation may take into account a maximum encoding capacity available to each source to encode display content. In display systems 10 including multiple (i.e., at least two) display renderers 16, decoding capacity, and/or the bandwidth of each display renderer 16 may be the same for each display renderer 16 or may vary between the display renderers 16.

The objective function is constructed in order to weight certain characteristics of the optimized layout. For example, the objective function may be weighted to favor the selection of high quality display content for windows having larger areas. The weight given to each window to favor the selection of high quality display content may be proportional to the area of each window. As will be understood by one of ordinary skill in the art, the objective function may be constructed in order to have alternative implementations favored to weight for different characteristics.

Optimizing the objective function may comprise maximizing the objective function, such that, for the optimized layout, a maximum of system resources are used without exceeding the system resources. The objective function may be optimized within additional constraints to the system resources constructed prior to optimizing the objective function. For example, an additional constraint may be that each window in the layout is assigned a quality level such that display content is displayed in the window. The objective function may also be constrained, for windows spanning multiple display renderers, to apply the same quality for the display content in each region of the window.

The controller 12 may also receive a proposed layout prior to optimizing the objective function. The proposed layout may be used as a seed point for optimization of the layout. The term "seed point", as used herein, refers to the starting point from which optimization of the layout begins.

The controller may output the optimized layout. For example, the controller 12 may output the optimized layout by instructing the at least one source 14 to provide display content to the associated at least one display renderer 16 at the quality defined in the optimized layout. The controller 12 may also output the optimized layout to a memory or database.

Figure 3:
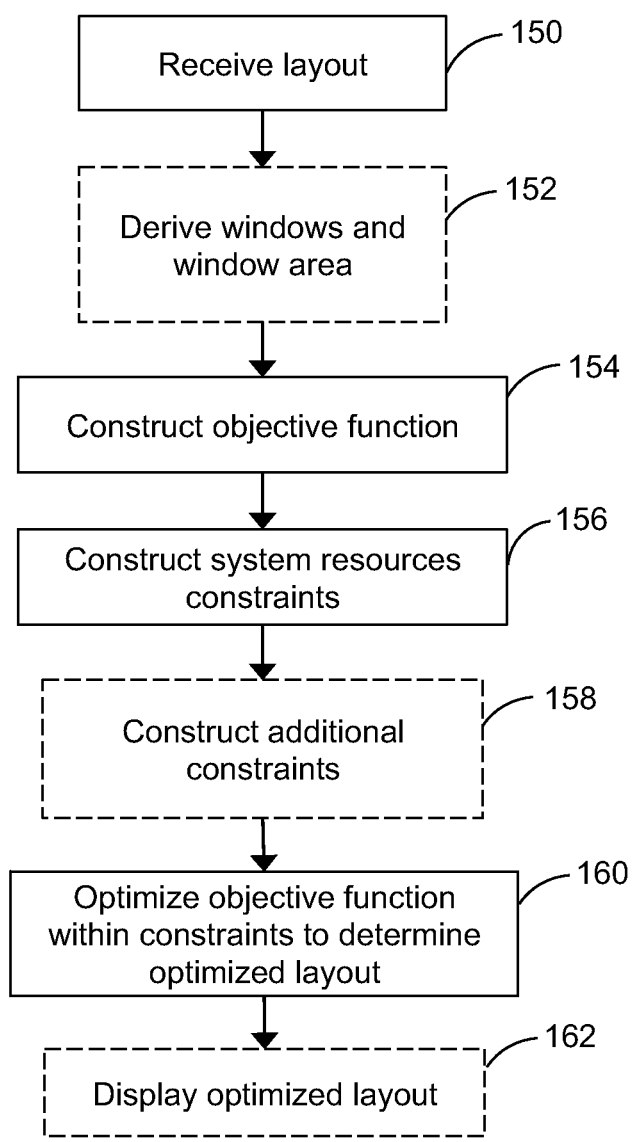
FIG. 3 is a block diagram illustrating a method for optimally determining the quality of content to display in each window of a layout without exceeding system resources.

With reference to FIG. 3, a block diagram depicting a method for optimally determining the quality of display content to display in each window of a layout without exceeding system resources is shown. The controller 12 may perform each step of the method.

In process block 150, a layout is received. The layout may define the windows and area of each window in the layout. If the windows and window area is not defined, in optional process block 152, the system may derive from the layout the windows and area of each window in the layout.

In process block 154, an objective function is constructed. The objective function may be a linear objective function that is maximized using integer programming, e.g., binary integer programming. The constraints to the objective function, e.g., may be linear or nonlinear. For example, where the quality of display content is either low quality or high quality, the objective function M may be defined as described in the following equation:

$$M = \sum_{i}^{N} \sum_{j}^{n_i} (w_x x_{ij} + w_y y_{ij}) a_{ij}$$

In the above equation, N is the number of display renderers 16, $n_i$ is the number of windows in the layout that the $i^{th}$ display renderer 16 has to show, $w_{ij}$ is the $j^{th}$ window in the $i^{th}$ display renderer 16, $w_x$ is the weighting factor given to low quality display content, $w_y$ is the weighting factor given to high quality display content, and $a_{ij}$ is the area of the window $w_{ij}$. In the equation, $x_{ij}=1$ if the $i^{th}$ display renderer is to use the low quality display content in window $w_{ij}$. Similarly, $y_{ij}=1$ if the $i^{th}$ display renderer is to use the high quality display content in window $w_{ij}$. As such, if $y_{ij}=1$ for a given window $w_{ij}$, high quality display content is displayed in the window. Alternatively, if $x_{ij}=1$ for a given window $w_{ij}$, low quality display content is displayed in the window $w_{ij}$. However, if $x_{ij}=0$ and $y_{ij}=0$, no display content is displayed in the window $w_{ij}$.

As will be understood by one of ordinary skill in the art, the objective function M can be extended to more than two quality levels, with each quality level having a different required bandwidth, encoding resources, and decoding resources.

The objective function M is constructed such that windows $w_{ij}$ with larger areas $a_{ij}$ play a more important role over smaller windows. To give priority for high quality over low quality, the factors $w_x$ and $w_y$ are chosen such that $w_x < w_y$.

Maximizing the objective function M results in a set of variables $x_{ij}$ and $y_{ij}$ for each window $w_{ij}$ in the layout. Consequently, the following inequality applies to the set of variables $x_{ij}$ and $y_{ij}$:

$$x_{ij}+y_{ij} \leq 1, i=1 \ldots N, j=1 \ldots n_i$$

The above inequality expresses that, for any window $w_{ij}$, either low quality display content, high quality display content, or, if, e.g., the system is lacking resources to display content in that window (i.e., $x_{ij}$ and $y_{ij}$ are both equal to 0), no quality of display content is assigned. As the variables $x_{ij}$ and $y_{ij}$ are integers and can only take the values 0 or 1, the model may be a Binary Integer Programming model.

Next, in process block 156, constraints to the objective function are constructed based on the system resources. The construction of the constraints based on the system resources is further described in FIG. 4.

Optionally, in process block 158, additional constraints to the objective function are constructed. For example, layout constraints may be constructed.

The layout constraints are layout dependent and may be automatically derived from analyzing the layout. For example, if adjacent windows $w_{ij}$ and $w_{kl}$ in the layout receive display content from the same source and window $w_{ij}$ is on the $i^{th}$ display renderer and $w_{kl}$ is on the $k^{th}$ display renderer, then the objective function M is constrained such that $x_{ij}=x_{kl}$ and $y_{ij}=y_{kl}$. This constraint is based on the assumption that the window $w_{ij}$ on the $i^{th}$ display renderer and the window $w_{kl}$ on the $k^{th}$ display renderer use the same source and thus should use the same quality level.

In process block 160, the objective function is optimized within the system resources and optional additional constraints to determine an optimized layout. In the optimized layout, the quality of the display content is indicated for the windows of the layout. The optimized layout may optionally be displayed on the display wall in process block 162.

Figure 4:
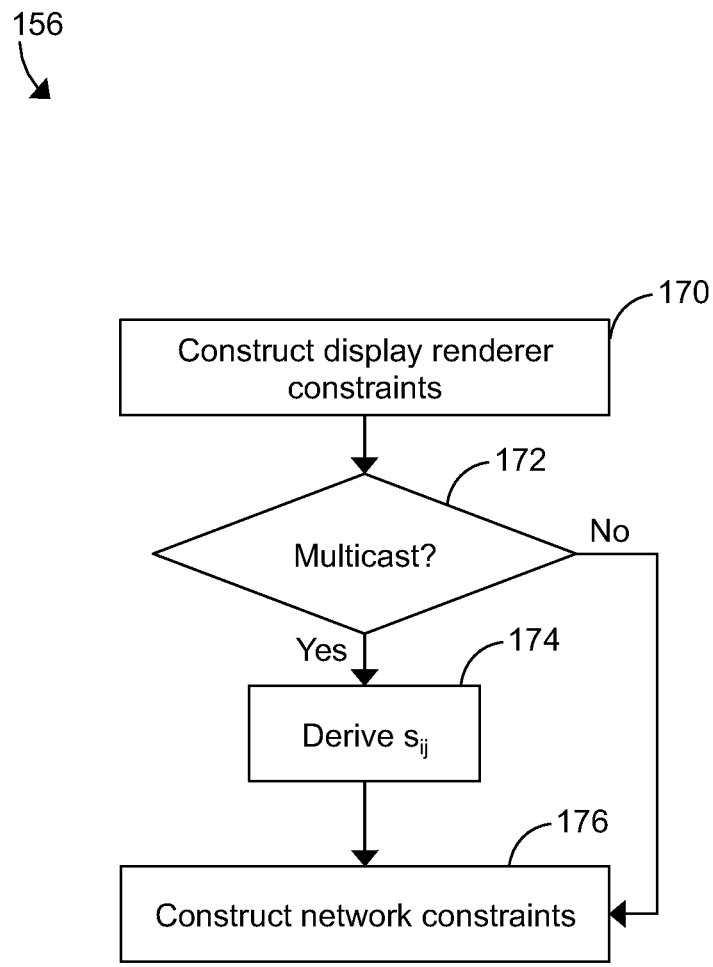
FIG. 4 is a block diagram illustrating steps for constructing constraints to the objective function based on system resources.

FIG. 4 further describes the construction of constraints based on the system resources. In process block 170, display renderer constraints are construed. For example, just as display renderers 16 have a limited bandwidth to receive display content, display renderers 16 may also have limited capacity to decode display content. This limitation may be accounted for by constraining the objective function M according to the following equation:

$$d_x \sum_{j}^{n_i} x_{ij} + d_y \sum_{j}^{n_i} y_{ij} \leq D, i = 1 \ldots N$$

In the above equation, $d_x$ is a decoding capacity required to decode the low quality display content, $d_y$ is a decoding capacity required to decode the high quality display content, and D is a maximum decoding capacity that a display renderer 16 has available to decode display content. The maximum decoding capacity D may be the same for all display renderers 16 in the system 10 or may vary between display renderers 16.

Just as the display renderers have limited capacity to decode display content, the sources 14 may have limited capacity to encode display content.

In process block 176, network constraints are constructed. For example, the objective function M may be constrained according to the following equation:

$$b_x X + b_y Y \leq B$$

In the above equation, B is a maximum bandwidth of a network available to transfer display content to the display renderers 16. The variables X and Y are dependent on whether sources 14 provide display content using unicast or multicast. Thus, in determining block 172, prior to determining network constraints, a check is performed to determined if the sources 14 are transferring the display content using unicast or multicast. If the display content is sent using unicast, the load for the network 20 may be calculated in process block 176 by counting the number of low and high quality streams received by all the display renderers 16. In this case, X and Y are equal to:

$$X = \sum_{i}^{N} \sum_{j}^{n_i} x_{ij}$$

$$Y = \sum_{i}^{N} \sum_{j}^{n_i} y_{ij}$$

Conversely, if the sources 14 transfer the display content using multicast, processing moves to process block 174. If the display content is sent using multicast, the load for the network 20 may be calculated by taking into account that if, e.g., one or multiple display renderers 16 requests a particular source 14 in low quality, that low quality stream only needs to be counted once. This fact is taken into account by determining $s_{ijk}$ for each window in the layout. To accurately count sources 14 providing display content in multicast, the layout with windows $w_{ij}$ is analyzed and the parameter $s_{ijk}$ are deduced with the following meaning: if $s_{ijk}=1$ the window $w_{ij}$ is associated with the $k^{th}$ source and if $s_{ijk}=0$ the window $w_{ij}$ is not associated with the $k^{th}$ source. Thus, for every window $w_{ij}$ exactly one $s_{ijk}$ parameter is equal to 1, as the window $w_{ij}$ can only show one source at a time. Using $s_{ijk}$, X and Y are equal to:

$$X = \sum_{k}^{K} \left\{ 1 - \prod_{i}^{N} \prod_{j}^{n_i} (1 - x_{ij} s_{ijk}) \right\}$$

$$Y = \sum_{k}^{K} \left\{ 1 - \prod_{i}^{N} \prod_{j}^{n_i} (1 - y_{ij} s_{ijk}) \right\}$$

In the above equation, K is the number of different sources 14 and each source 14 is indexed by k=1 . . . K. Thus, in process block 176, the above formula for X and Y in the multicast scenario counts the number of different sources 14 of respectively low and high quality that will be present on the network 20 when using a particular set of $x_{ij}$ and $y_{ij}$ variables.

Another exemplary network constraint on objective function M is described in the following equation:

$$b_x \sum_{j}^{n_i} x_{ij} + b_y \sum_{j}^{n_i} y_{ij} \leq P, i = 1 \ldots N$$

In the above equation, $b_x$ is a bandwidth required to receive the low quality display content, $b_y$ is a bandwidth required to receive the high quality display content, and P is a maximum bandwidth that a display renderer 16 has available to receive display content. In the above equation, each display renderer 16 is constrained such that the bandwidth of all display content received is less than the maximize bandwidth of the display renderer 16. The maximize bandwidth P may be the same for each display renderer or may vary between display renderers 16.

As indicated previously, $w_x$ expresses the preference of the system for low quality over high quality, while $w_y$ expresses the preference for high quality over low quality. The weighting factors $w_x$, $w_y$ may be assigned values such that $w_x < w_y$, i.e., the system prefers high quality over low quality. For example, the weighting factors may be assigned the following values: $w_x=1$ and $w_y=2$. The larger the ratio $w_y/w_x$, the more the system will "prefer" to assign high quality display content to larger windows. Exemplary values for the weighting factors are $w_x=1$ and $w_y=1.2$. The actual values for the weighting factors $w_x$ and $w_y$ are configurable and may be tuned to suit the preference of the user and the application.

The method of FIG. 3 may be repeatedly performed to achieve a desired result. For example, in cases where display content is not assigned a quality level in at least one window (i.e., no display content is displayed in at least one window), constraints may be reconfigured such that display content is displayed in each window of the layout. In the example, the solution space for an optimized layout, in which display content is not displayed in at least one window, may be altered by reconfiguring the bandwidth $b_x$ and/or $b_y$ such that it is possible to determine an optimized solution where display content is displayed in each window. That is, for a given set of constraints, display content may not be displayed in each window, but by repeatedly performing the method described in FIG. 3 and reconfiguring the bandwidth $b_x$ and/or $b_y$ each iteration, it may be possible to find bandwidth values for which display content is displayed in every window of the layout.

The above-described method may also be used to represent display content that requires pre-processing before reception by a display renderer 16 and display content that can be directly received and decoded by a display renderer 16. For example, if $x_{ij}=1$, a pre-processing step is required prior to the $i^{th}$ display renderer receiving the display content to display in window $w_{ij}$. Alternatively, if $y_{ij}=1$, a pre-processing step is not required prior to the $i^{th}$ display renderer receiving the display content to display in window $w_{ij}$. For example, this formulation of the model may be used in the downscaling of display content by a networked scaler or transcoding of the source by a networked transcoder. In these examples, the system can apply a two-phase approach by first calculating the display content that requires pre-processing, followed by enabling the required pre-processing.

As described above, the network 20 is modeled as a single variable, the maximum bandwidth B that the network can support. If the topology of the network 20 is known, more complex scenarios can be taken into account. For example, a more complex abstraction of the network 20 may be possible if, e.g., the topology of the network elements are known, the connectivity of each encoder and decoder is known, and the path taken by each source in the network 20 is known. Knowing the topology of the network elements, e.g., switches and routers, may include knowing the connections between elements and the bandwidth available between the elements. Knowing the connectivity of each encoder and decoder may include knowing the sources 14 that send display content by each encoder, the network element that each encoder is connected to, each decoder that receives the display content, and the network element that the decoder is connected to. Knowing the path taken by a source 14 may include knowing the path taken by each encoder through the network 20 to reach each receiving decoder. Using this information, e.g., it is possible to model the limitations on the amount of traffic that can flow between one network element and another, thereby preventing overloading the links between network elements.

Sources 14 providing display content using multicast may be further modeled. For example, the number of simultaneous multicast groups that can be managed by the network 20 may be fixed. By modeling this as an additional constraint, the system 10 can prevent display renderers 16 from requesting more multicast groups than the network can handle. This can be modeled in a constraint very similar to that of bandwidth.

For all of the windows in a layout, the area $a_{ij}$ may be calculated using a straightforward method, such as width multiplied by height of the window. There are also other more advanced ways to calculate the area $a_{ij}$. For example, in some cases, the pixel density of display renderers 16 in a display wall are different. In such a case, the area $a_{ij}$ may be calculated to take into account the pixel density of each display renderer 16. As an example, the visible area of a window on a high density LCD panel might be smaller than a window on a projector cube, although a simple pixel calculation favors the window on the LCD panel. In this case, a user may obtain a better result by giving priority to assigning higher quality to the window on the projector cube, although the actual number of pixels for that window might be smaller than that of the window on the LCD panel.

The area $a_{ij}$ of a window $w_{ij}$ may be determined based on the area of the display content displayed in the window $w_{ij}$ as opposed to the area of the window $w_{ij}$ itself. For example, if the dimension of the window area $a_{ij}$ on the display renderer 16 does not match the aspect ratio of the source 14, a decoder may perform scaling of the display content. Scaling may be performed such that the aspect ratio of the display content is preserved and the display content is displayed in the window using downscaling or upscaling with black borders to fit the window dimensions. Alternatively, the display content may be stretched in one dimension in order to fit the area of the window. Maintaining the aspect ratio or stretching the display content may be a user preference that is taken into account during calculation of the area $a_{ij}$ for a window. If the aspect ratio is to be preserved, the area $a_{ij}$ may not be calculated as the window area, but rather the area of the window may be calculated to equal the portion of the window filled by the scaled source. That is, the area $a_{ij}$ of the window $w_{ij}$ may be calculated based on the portion of the window that is occupied after downscaling or upscaling the display content to fit the window.

What is claimed is:

1. A controller for optimally determining, for a layout of windows on a display wall of a display system, the quality of display content to display in each window without exceeding system resources of the display system, the display system receiving display content from at least one source, at least one of the at least one source providing display content at multiple qualities, the controller is arranged to:
  receive the layout, the layout defining an arrangement of windows on the display wall, each window directed to displaying display content from one source;
  construct an objective function defining the quality of display content displayed in each window to be low quality display content or high quality display content that uses more of the s stem resources than displaying the low quality display content;
  wherein the controller includes a processor, the processor arranged to optimize the objective function to determine an optimized layout that does not exceed system resources of the display system; and
  wherein the controller outputs the optimized layout for displaying display content using the system resources of the display system.

2. The controller of claim 1, wherein the objective function is weighted to favor the selection of high quality display content for windows having larger areas.

3. The controller of claim 2, wherein, in the objective function, the weight given to each window to favor the selection of high quality display content for windows having larger areas is proportional to the area of the window.

4. The controller of claim 1, wherein optimizing the objective function includes maximizing the objective function such that for the optimized layout a maximum of system resources are used without exceeding the system resources.

5. The controller of claim 4, wherein the objective function is a linear objective function that is maximized using integer programming.

6. The controller of claim 5, wherein the objective function is maximized using binary integer programming.

7. The controller of claim 1, wherein constraints to the objective function are constructed prior to optimizing the objective function and the objective function is optimized within the constraints.

8. The controller of claim 7, the display system receiving display content over a network, wherein one constraint is that a bandwidth required to receive all of the display content does not exceed a maximum allotted bandwidth of the network.

9. The controller of claim 1, wherein during optimization the objective function may not assign a quality level to the display content in a given window such that display content is not displayed in the given window.

10. The controller of claim 9, wherein constraints to the objective function are constructed prior to optimizing the objective function, the objective function is optimized within the constraints, and one constraint is that each window is assigned a quality level that includes displaying display content in the window.

11. The controller of claim 1, wherein the multiple qualities are differentiated by at least one of resolution, compression, color content, encryption, or further processing requirements.

12. The controller of claim 1, wherein the layout defines at least one of the number of windows, the position of each window, the shape of each window, and the area of each window.

13. The controller of claim 1, wherein the layout is a user defined layout.

14. The controller of claim 1, wherein each source is one of a camera or a computer.

15. The controller of claim 1, wherein the controller comprises a processor arranged to execute instructions stored in a memory.

16. The controller of claim 1, wherein the display system receives display content from more than one source.

17. The controller of claim 1, wherein the controller calculates the windows in the layout and an area for each window in the layout.

18. The controller of claim 1, wherein:
  the controller is further arranged to receive a proposed layout; and
  the processor is further arranged to use the proposed layout as a seed point for optimizing the objective function.

19. The controller of claim 1, wherein the controller is further arranged to provide instructions to the at least one source specifying the quality of display content to output.

20. A display system for optimally determining, for a layout of windows on a display wall of the display system, the quality of display content to display in each window without exceeding system resources, the display system comprising:
  the controller of claim 1;
  at least one display renderer, wherein:
    each display renderer is responsible for displaying display content on a particular region of the display wall;
    each display renderer receives display content from at least one of the at least one source; and
  the display wall, wherein the layout of windows is displayed on the display wall and display content is displayed in each window at the quality level specified in the optimized layout.

21. The display system of claim 20, the at least one display renderer receiving display content over a network, wherein the system resources include at least one of a maximum network bandwidth, a maximum bandwidth of each display renderer to receive display content, a maximum decoding capacity of each display renderer to decode display content, and a maximum encoding capacity of each source to encode display content.

22. The display system of claim 21, wherein the objective function is constrained such that for each display renderer, a bandwidth required to receive all of the display content received by each display renderer over the network does not exceed the maximum bandwidth of that display renderer.

23. The display system of claim 22, further comprising at least two display renderers.

24. The display system of claim 23, wherein the objective function is constrained, for windows spanning multiple display renderers, to apply the same quality for each region of the window.

25. The display system of claim 23, wherein at least one window in the layout includes display content displayed by at least two display renderers.

26. The display system of claim 23, wherein at least two of the display renderers have at least one of a different screen resolution, number of pixels, or pixel density.

27. The display system of claim 21, wherein the objective function is constrained such that for each display renderer, a decoding capacity required to decode all of the display content received by that display renderer does not exceed the maximum decoding capacity available to that display renderer to decode display content.

28. The display system of claim 20, wherein the display system receives display content from more than one source.

29. The display system of claim 20, wherein the objection function M is defined as:

$$M = \sum_{i}^{N} \sum_{j}^{n_i} (w_x x_{ij} + w_y y_{ij}) a_{ij},$$

wherein N is the number of display renderers, $n_i$ is the number of windows in the layout that the $i^{th}$ display renderer has to show, $w_x$ is the weighting factor given to low quality display content, $w_y$ is the weighting factor given to high quality content, where $w_x < w_y$, $x_{ij}=1$ if the $i^{th}$ display renderer should use the low quality display content in window $W_{ij}$, $y_{ij}=1$ if the $i^{th}$ display renderer should use the high quality display content in window $W_{ij}$, and $a_{ij}$ is the area of the window $w_{ij}$.

30. The display system of claim 29, wherein the controller calculates $w_{ij}$ and $a_{ij}$ for each window in the layout.

31. The display system of claim 29, wherein if adjacent windows $w_{ij}$ and $w_{kl}$ in the layout receive display content from the same source and window $w_{ij}$ is on the $i^{th}$ display renderer and $w_{kl}$ is on the $k^{th}$ display renderer, then the objective function M is constrained such that $x_{ij}=x_{kl}$ and $y_{ij}=y_{kl}$.

32. The display system of claim 29, wherein the objective function M is constrained according to the following constraint:

$$b_x \sum_{j}^{n_i} x_{ij} + b_y \sum_{j}^{n_i} y_{ij} \le P, i = 1 \ldots N,$$

wherein $b_x$ is a bandwidth required to receive the low quality display content, $b_y$ is a bandwidth required to receive the high quality display content, and P is a maximum bandwidth that a display renderer has available to receive display content.

33. The display system of claim 29, wherein the objective function M is constrained according to the following constraint:

$$b_x X + b_y Y \le B$$

wherein $b_x$ is a bandwidth required to receive the low quality display content, $b_y$ is a bandwidth required to receive the high quality display content, B is a maximum bandwidth of a network available to transfer display content to the display system, if the sources transfer the display content using unicast, X and Y are equal to:

$$X = \sum_{i}^{N} \sum_{j}^{n_i} x_{ij}$$

$$Y = \sum_{i}^{N} \sum_{j}^{n_i} y_{ij}$$

if the sources transfer the display content using multicast, X and Y are equal to:

$$X = \sum_{k}^{K} \left\{ 1 - \prod_{i}^{N} \prod_{j}^{n_i} (1 - x_{ij} s_{ijk}) \right\}$$

$$Y = \sum_{k}^{K} \left\{ 1 - \prod_{i}^{N} \prod_{j}^{n_i} (1 - y_{ij} s_{ijk}) \right\}$$

wherein K is the number of sources and $s_{ijk}=1$ if the window $w_{ij}$ is associated with the $k^{th}$ source and $s_{ijk}=0$ if the window $w_{ij}$ is not associated with the $k^{th}$ source.

34. The display system of claim 29, wherein the objective function M is constrained according to the following constraint:

$$d_x \sum_{j}^{n_i} x_{ij} + d_y \sum_{j}^{n_i} y_{ij} \le D, i = 1 \ldots N,$$

wherein $d_x$ is a decoding capacity required to decode the low quality display content, $d_y$ is a decoding capacity required to decode the high quality display content, and D is a maximum decoding capacity that a display renderer has available to decode display content.

35. The display system of claim 20, wherein the display wall is an IP display wall and the sources are streamed over a network to the display system.

36. The display system of claim 20, wherein each display renderer is one of a projector, a monitor, or a television.

37. A method for optimally determining, for a layout of windows on a display wall of a display system, the quality of display content to display in each window without exceeding system resources of the display system, the display system receiving display content from the at least one source, at least one of the at least one source providing display content at multiple qualities, the method comprising:
  receiving the layout of the display wall, wherein the layout defines an arrangement of windows on the display wall and each window displays display content from one source;
  constructing an objective function defining the quality of display content displayed in each window of the layout to be low quality display content or high quality display content that uses more of the system resources than displaying the low quality display content;
  optimizing the objective function to determine an optimized layout that does not exceed system resources of the display system; and outputting the optimized layout for displaying display content using the system resources of the display system.

38. The method of claim 37, wherein the objective function is weighted to favor the selection of high quality display content for windows having larger areas.

\* \* \* \* \*